United States Patent
Sikander

(10) Patent No.: US 10,014,822 B2
(45) Date of Patent: Jul. 3, 2018

(54) SNOW REMOVAL ASSEMBLY

(71) Applicant: Tariq Sikander, Kitchener (CA)

(72) Inventor: Tariq Sikander, Kitchener (CA)

( * ) Notice: Subject to any disclaimer, the term of this patent is extended or adjusted under 35 U.S.C. 154(b) by 199 days.

(21) Appl. No.: 14/987,222

(22) Filed: Jan. 4, 2016

(65) Prior Publication Data
US 2017/0194899 A1    Jul. 6, 2017

(51) Int. Cl.
| | |
|---|---|
| *H05B 3/60* | (2006.01) |
| *H05B 3/26* | (2006.01) |
| *H02S 40/12* | (2014.01) |
| *E01H 5/10* | (2006.01) |
| *F22B 1/30* | (2006.01) |

(52) U.S. Cl.
CPC ............. *H02S 40/12* (2014.12); *E01H 5/10* (2013.01); *F22B 1/30* (2013.01); *H05B 3/60* (2013.01)

(58) Field of Classification Search
None
See application file for complete search history.

(56) References Cited

U.S. PATENT DOCUMENTS

| | | | | |
|---|---|---|---|---|
| 2,844,696 A | * | 7/1958 | Custer, Jr. ............. | F24D 13/022 219/213 |
| 3,236,991 A | * | 2/1966 | Graham ................. | E01C 11/265 219/213 |
| 3,812,320 A | * | 5/1974 | Borgren ................. | F24D 13/02 219/213 |
| 3,878,362 A | * | 4/1975 | Stinger .................. | B32B 27/00 219/528 |
| 3,900,654 A | * | 8/1975 | Stinger .................. | B32B 27/00 156/47 |
| 4,485,297 A | * | 11/1984 | Grise .................... | H05B 3/56 174/255 |
| 4,564,745 A | * | 1/1986 | Deschenes ............ | F24D 13/024 219/213 |
| 5,233,971 A | | 8/1993 | Hanley | |
| 5,368,654 A | | 11/1994 | Bergevin et al. | |
| 5,380,988 A | * | 1/1995 | Dyer ..................... | E01C 11/265 219/213 |
| 5,550,350 A | * | 8/1996 | Barnes .................. | E01C 11/265 219/213 |
| 5,591,365 A | * | 1/1997 | Shields ................. | E01C 11/265 219/213 |
| 6,051,811 A | * | 4/2000 | Hardison .............. | H05B 3/00 135/119 |
| 6,184,496 B1 | | 2/2001 | Pearce | |
| 6,211,493 B1 | | 4/2001 | Bouman | |
| 6,278,085 B1 | | 8/2001 | Abukasm | |
| 7,230,213 B2 | * | 6/2007 | Naylor .................. | E01C 11/265 219/213 |

(Continued)

*Primary Examiner* — Thor Campbell

(57) ABSTRACT

A snow removal assembly includes a fluid that may be applied to a support surface. The fluid is comprised of an electrically conductive material. The fluid generates heat when an electrical current is applied to the fluid thereby facilitating the fluid to melt snow on the support surface. A sheet is provided and the sheet may be coupled to the fluid when the fluid is applied to the support surface. The sheet may inhibit the fluid from being abraded from the support surface. A power supply is provided and the power supply may be positioned on the support surface. The power supply is electrically coupled to the fluid when the fluid is applied to the support surface thereby facilitating the fluid to generate heat.

7 Claims, 3 Drawing Sheets

(56) References Cited

U.S. PATENT DOCUMENTS

| | | | |
|---|---|---|---|
| D562,611 S | 2/2008 | Rundle | |
| 7,883,609 B2* | 2/2011 | Petrenko | B60S 1/026 |
| | | | 204/242 |
| 8,306,408 B2* | 11/2012 | Abbott | B32B 7/02 |
| | | | 219/213 |
| 8,653,423 B2* | 2/2014 | Olding | C08L 71/00 |
| | | | 219/482 |
| 8,952,301 B2* | 2/2015 | Naylor | A01G 13/06 |
| | | | 219/213 |
| 2002/0017466 A1* | 2/2002 | Petrenko | B82Y 30/00 |
| | | | 205/742 |
| 2004/0016740 A1 | 1/2004 | McDonald | |
| 2004/0099654 A1 | 5/2004 | Pais | |
| 2008/0047498 A1* | 2/2008 | Hollyday | A01K 7/027 |
| | | | 119/73 |
| 2008/0202498 A1* | 8/2008 | Ramos | F24J 2/0461 |
| | | | 126/626 |
| 2010/0243754 A1* | 9/2010 | Harris | A01M 1/2033 |
| | | | 239/34 |
| 2012/0028080 A1* | 2/2012 | Truitt | H01M 2/1022 |
| | | | 429/7 |
| 2014/0041713 A1* | 2/2014 | Adler | H05B 3/26 |
| | | | 136/251 |
| 2014/0284022 A1* | 9/2014 | Maxbauer | B60H 1/2218 |
| | | | 165/41 |
| 2015/0001201 A1* | 1/2015 | Adler | F24J 2/461 |
| | | | 219/213 |
| 2015/0021310 A1* | 1/2015 | Van Straten | F24J 2/461 |
| | | | 219/213 |
| 2017/0194811 A1* | 7/2017 | Chan | H02S 40/40 |

* cited by examiner

SNOW REMOVAL ASSEMBLY

BACKGROUND OF THE DISCLOSURE

Field of the Disclosure

The disclosure relates to snow removal devices and more particularly pertains to a new snow removal device for melting snow from a support surface.

SUMMARY OF THE DISCLOSURE

An embodiment of the disclosure meets the needs presented above by generally comprising a fluid that may be applied to a support surface. The fluid is comprised of an electrically conductive material. The fluid generates heat when an electrical current is applied to the fluid thereby facilitating the fluid to melt snow on the support surface. A sheet is provided and the sheet may be coupled to the fluid when the fluid is applied to the support surface. The sheet may inhibit the fluid from being abraded from the support surface. A power supply is provided and the power supply may be positioned on the support surface. The power supply is electrically coupled to the fluid when the fluid is applied to the support surface thereby facilitating the fluid to generate heat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
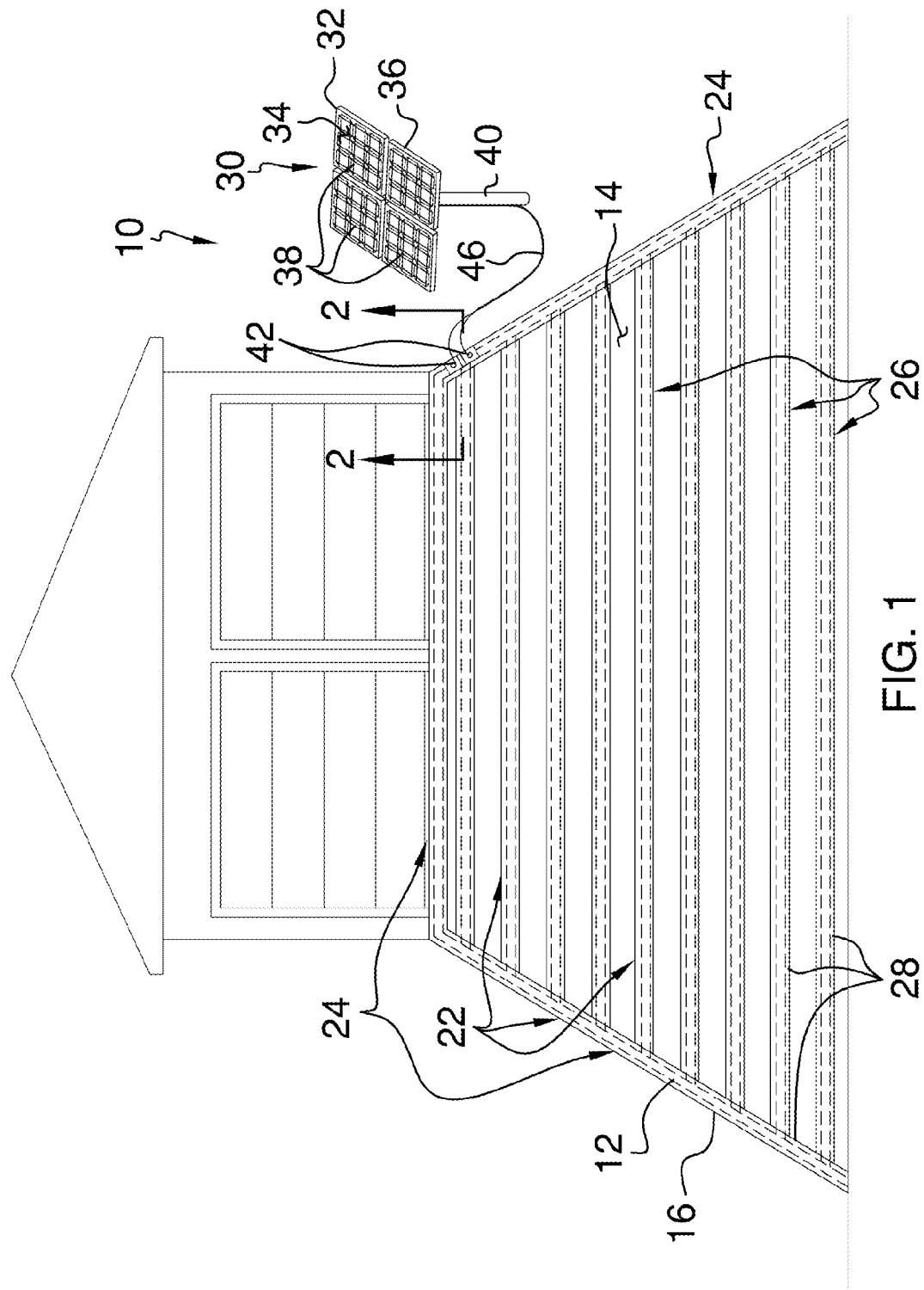
FIG. 1 is a perspective in-use view of a snow removal assembly according to an embodiment of the disclosure.
Figure 2:
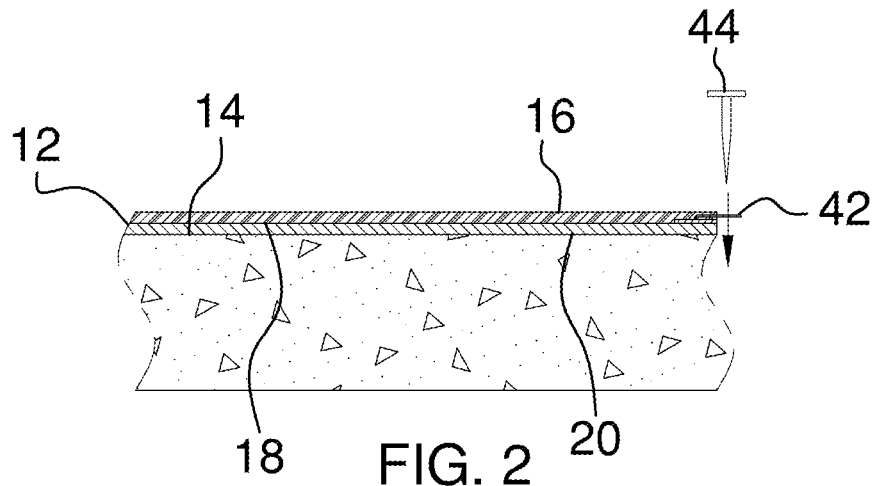
FIG. 2 is a cross sectional view taken along line 2-2 of FIG. 1 of an embodiment of the disclosure.
Figure 3:
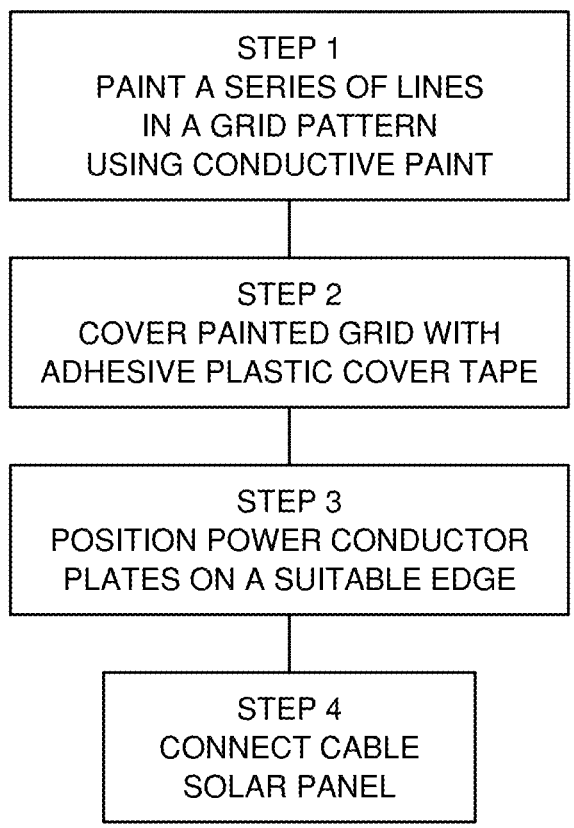
FIG. 3 is a logic tree view of an embodiment of the disclosure.
Figure 4:
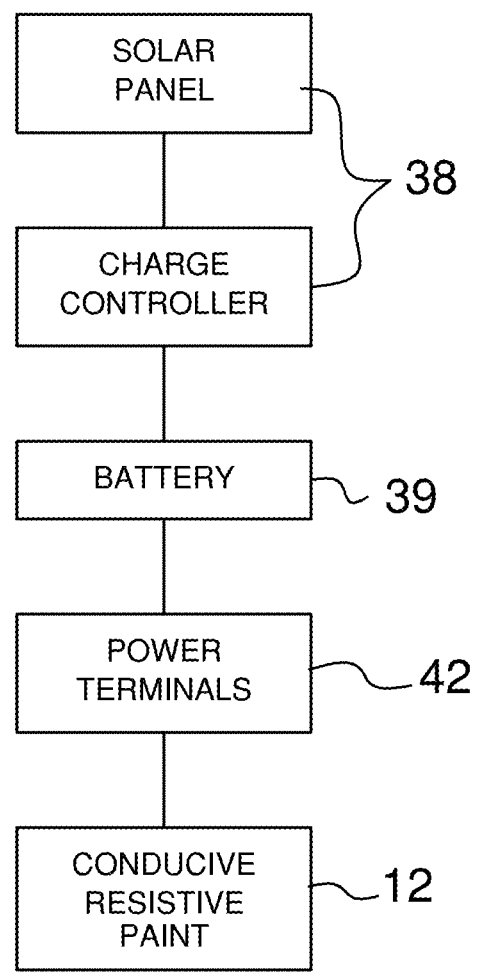
FIG. 4 is a schematic view of an embodiment of the disclosure.

With reference now to the drawings, and in particular to FIGS. 1 through 4 thereof, a new snow removal device embodying the principles and concepts of an embodiment of the disclosure and generally designated by the reference numeral 10 will be described.

As best illustrated in FIGS. 1 through 4, the snow removal assembly 10 generally comprises a fluid 12 that may be applied to a support surface 14. The fluid 12 is comprised of an electrically conductive material. The fluid 12 generates heat when an electrical current is applied to the fluid 12. Thus, the fluid 12 may melt snow when the snow accumulates on the support surface 14. The support surface 14 may comprise a driveway, a sidewalk or other support surface comprising a resilient aggregate.

A sheet 16 is provided and the sheet 16 may be positioned on the fluid 12 when the fluid 12 is applied to the support surface 14. The sheet 16 is comprised of a thermally conductive material and the sheet 16 communicates the heat generated by the fluid 12. The sheet 16 is comprised of a resilient material to inhibit the fluid 12 from being abraded from the support surface 14. The sheet 16 has a bottom surface 18 and the sheet 16 may comprise traffic tape or the like.

An adhesive layer 20 is coupled to the bottom surface 18 of the sheet 16. The adhesive layer 20 adhesively engages the fluid 12 when the sheet 16 is positioned on the fluid 12. Thus, the sheet 16 is retained on the fluid 12. The adhesive layer 20 may comprise a high strength construction adhesive or the like.

The fluid 12 may be applied in a plurality of stripes 22 on the support surface 14. The plurality of stripes 22 may comprise a set of perimeter stripes 24 that extend around a perimeter of the support surface 14. The plurality of stripes 22 may further include a set of medial stripes 26. The medial stripes 26 may extend across the support surface 14 and intersect the perimeter stripes 24. Thus, the stripes 22 may form a grid on the support surface 14. The sheet 16 may comprise a plurality of strips 28. Each of the strips 28 may be coextensively positioned on top of an associated one of the medial stripes 26 and the perimeter stripes 22.

A power supply 30 is provided and the power supply 30 may be positioned on the support surface 14. The power supply 30 is electrically coupled to the fluid 12 when the fluid 12 is applied to the support surface 14. Thus, the power supply 30 facilitates the fluid 12 to generate heat. The fluid 12 may generate a maximum temperature ranging between approximately fifty degrees Fahrenheit and seventy degrees Fahrenheit.

The power supply 30 comprises a panel 32 has an upper surface 34 and a lower surface 36. A solar array 38 is coupled to the upper surface 34 such that the solar array 38 may be exposed to sunlight. The solar array 38 may comprise a plurality of solar panels or the like. The power supply 30 may additionally include a battery 39 that is electrically coupled to the solar array 38. The solar array 38 charges the battery 39.

A rod 40 is coupled to and extends downwardly from the lower surface 36. The rod 40 is manipulated to penetrate the support surface 14 thereby facilitating the solar array 38 to be exposed to sunlight. The power supply 30 may be positioned adjacent to a selected one of the perimeter stripes 24.

A pair of plates 42 is provided and each of the plates 42 is positioned between the fluid 12 and the sheet 16. Each of the plates 42 is comprised of an electrically conductive material such that each of the plates 42 is in electrical communication with the fluid 12. Each of the plates 42 may be positioned on a selected one of the perimeter stripes 24. A pair of fasteners 44 may each be extended through an associated one of the plates 42 and penetrate the support surface 14. Thus, the plates 42 are retained on the support surface 14.

A pair of conductors 46 is provided. Each of the conductors 46 is electrically coupled to the solar array 38. Each of the conductors 46 extends outwardly from the rod 40. Each of the conductors 46 is electrically coupled to an associated one of the plates 42. Thus, the solar array 38 is in electrical communication with the fluid 12.

In use, the fluid 12 is applied to the support surface 14 and the fluid 12 is allowed to dry. The plates 42 are positioned on the fluid 12 and the plates 42 are fastened to the support surface 14. The sheet 16 is positioned to cover the fluid 12. The rod 40 is extended into the support surface 14 such that the power supply 30 is positioned proximate the fluid 12. Each of the conductors 46 is electrically coupled to an associated one of the plates 42.

The solar array 38 induces the electrical current into the fluid 12 when sunlight strikes the solar array 38. Thus, the fluid 12 generates heat to melt the snow from the support surface 14. The fluid 12 facilitates the support surface 14 to remain clear of the snow without requiring physical exertion. Thus, the fluid 12 reduces the chance of physical injury resulting from physically removing the snow from the support surface 14. Additionally, the fluid 12 facilitates the support surface 14 to be safely walked upon and driven upon during winter months.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A snow removal assembly comprising:
a fluid being configured to be applied directly to and dry upon a fixed support surface, said fluid being comprised of an electrically conductive material wherein said fluid is configured to generate heat when an electrical current is applied to said fluid thereby facilitating said fluid to melt snow on the fixed support surface;
a sheet being configured to be coupled to said fluid when said fluid is applied to and dried upon the fixed support surface, said sheet is configured to inhibit said fluid from being abraded from the fixed support surface after said fluid is dried;
a power supply being configured to be positioned on the fixed support surface, said power supply being electrically coupled to said fluid when said fluid is applied to and dried upon the fixed support surface thereby facilitating said fluid to generate heat.

2. The assembly according to claim 1, wherein:
said sheet is comprised of a resilient material; and
said sheet is comprised of a thermally conductive material wherein said sheet is configured to communicate the heat generated by said fluid, said sheet having a bottom surface.

3. The assembly according to claim 2, further comprising an adhesive layer being coupled to said bottom surface of said sheet, said adhesive layer adhesively engaging said fluid when said sheet is positioned on said fluid such that said sheet is retained on said fluid.

4. The assembly according to claim 1, wherein said power supply comprises:
a panel having an upper surface and a lower surface;
a solar array being coupled to said upper surface wherein said solar array is configured to be exposed to sunlight; and
a rod being coupled to and extending downwardly from said lower surface, said rod being configured to penetrate the support surface thereby facilitating said solar array to be exposed to sunlight.

5. The assembly according to claim 1, wherein said power supply comprises a pair of plates, each of said plates being positioned between said fluid and said sheet, each of said plates being comprised of an electrically conductive material such that each of said plates is in electrical communication with said fluid.

6. The assembly according to claim 5, wherein said power supply further comprises:
a solar array;
a rod; and
a pair of conductors, each of said conductors being electrically coupled to said solar array, each of said conductors extending outwardly from said rod, each of said conductors being electrically coupled to an associated one of said plates such that said solar array is in electrical communication with said fluid.

7. A snow removal assembly comprising:
a fluid being configured to be applied directly to and dry upon a fixed support surface, said fluid being comprised of an electrically conductive material wherein said fluid is configured to generate heat when an electrical current is applied to said fluid thereby facilitating said fluid to melt snow on the fixed support surface;
a sheet being configured to be coupled to said fluid when said fluid is applied to and dried upon the support surface, said sheet being comprised of a thermally conductive material wherein said sheet is configured to communicate the heat generated by said fluid, said sheet being comprised of a resilient material wherein said sheet is configured to inhibit said fluid from being abraded from the fixed support surface after said fluid is dried, said sheet having a bottom surface;
an adhesive layer being coupled to said bottom surface of said sheet, said adhesive layer adhesively engaging said fluid when said sheet is positioned on said fluid such that said sheet is retained on said fluid; and
a power supply being configured to be positioned on the support surface, said power supply being electrically coupled to said fluid when said fluid is applied to the support surface thereby facilitating said fluid to generate heat, said power supply comprising:
a panel having an upper surface and a lower surface,
a solar array being coupled to said upper surface wherein said solar array is configured to be exposed to sunlight,
a rod being coupled to and extending downwardly from said lower surface, said rod being configured to penetrate the support surface thereby facilitating said solar array to be exposed to sunlight, a pair of plates, each of said plates being positioned between said fluid and said sheet, each of said plates being comprised of an electrically conductive material such that each of said plates is in electrical communication with said fluid, and a pair of conductors, each of said conductors being electrically coupled to said solar array, each of said conductors extending outwardly from said rod, each of said conductors being electrically coupled to an associated one of said plates such that said solar array is in electrical communication with said fluid.

\* \* \* \* \*